Fig. 2.

G. ORNSTEIN.
PROCESS OF ANTISEPTICIZING WATER.
APPLICATION FILED FEB. 14, 1913.

1,142,361.

Patented June 8, 1915.

UNITED STATES PATENT OFFICE.

GEORG ORNSTEIN, OF NEW YORK, N. Y., ASSIGNOR TO ELECTRO BLEACHING GAS COMPANY, A CORPORATION OF NEW YORK.

PROCESS OF ANTISEPTICIZING WATER.

1,142,361.  Specification of Letters Patent.  Patented June 8, 1915.

Application filed February 14, 1913. Serial No. 748,284.

*To all whom it may concern:*

Be it known that I, GEORG ORNSTEIN, a citizen of the German Empire, residing at New York city, in the county of New York and State of New York, have invented certain new and useful Improvements in Processes of Antisepticizing Water, fully described and represented in the following specification and the accompanying drawings, forming a part of the same.

This invention relates to processes of antisepticizing waters; and it comprises a method wherein chlorin in determined amounts is uniformly distributed through and absorbed by a minor body of water flowing as a continuous current and said minor body is then uniformly distributed through a major body of water also flowing as a continuous current, all said operations being conducted without pause sufficient to allow disappearance of any substantial amount of said chlorin as free chlorin prior to exercising its antiseptic action; all as more fully hereinafter set forth and as claimed.

Chlorin is one of the best antiseptics and disinfectants known, as little as 0.1 to 0.4 parts per million of free chlorin being able to substantially sterilize or antisepticize most river or lake water, a proportionately greater amount being of course required for more contaminated water such as sewage. Its use however suffers from the drawback that it rapidly disappears, the free element going into combination and losing its bactericidal power. Light facilitates this disappearance, and further, most waters, and all sewages, contain substances reacting with chlorin in amounts sufficient to cause the disappearance of much more free chlorin than the minimal amount necessary for substantially complete sterilization. Organic matters, sulfur compounds, etc., all react chemically with free chlorin. A certain amount of time is, however, necessary for this chemical disappearance, while the bactericidal action is practically instantaneous. It is in practice desirable to use as little chlorin as will suffice to sterilize the water, this being for reasons of economy and because larger amounts may impart a taste to the water. But securing even and uniform distribution throughout a body of water of the infinitesimal amounts of chlorin needed for disinfection offers great difficulties, and particularly since this distribution must be very rapid; rapid enough to outstrip the chemical disappearance of the free chlorin.

The present invention has for its purpose the provision of a rapid, efficient and economical distribution of small sterilizing quantities of chlorin throughout comparatively large bodies of water, as in sterilizing flowing currents of water in city water supplies. For this purpose I use free chlorin, preferably the compressed commercial gas, although a current of chlorin from other sources, as for instance an electrolytic cell, may also be used. Bleaching powder and other hypochlorites are not applicable for my purposes for the reason that they depend in part for their antiseptic action on the development of hypochlorous acid by the carbonic acid naturally present in most waters; and this is, comparatively speaking and for the present purposes, a slow action; an action of the same order of velocity as the chemical reactions which tend to cause the disappearance of chlorin as free chlorin. With bleaching powder, therefore, ordinarily much more must be used than is necessary to secure sufficient chlorin for sterilization alone; and with these large quantities is apt to come the "hypo taste."

Direct introduction of chlorin into a body of water to be treated thereby is hardly practicable for several reasons, one being that the amount of chlorin necessary is relatively so little that uniform distribution is difficult and is apt to consume more time than can be, for the present purposes, afforded. In any way that it is added there will be, temporarily, spots or zones in the water containing more chlorin than is necessary for sterilization and much of this local excess of chlorin is apt to disappear chemically before the water can be homogenized and the chlorin evenly distributed. Another difficulty is that the absorption of gaseous chlorin is rather slow and in introducing it into a body of water, much is apt to pass upward as bubbles and escape and be wasted. And with temporary fluctuations in the height or pressure of a body of water, such as are inevitable in a flowing current, it is hard to adjust any gas supplying means so as to secure a uniform supply to the water for absorption thereby. The rate of escape of gas from any nozzle of course depends on the hydrostatic head of liquid above it. In the present invention, therefore, in lieu of directly treating the body of water, I first produce an absorption of the chlorin gas in a minor body of water to produce a solution of homogeneous character as regards strength or concentration and then use this body of water for admixture with a main or major body of water to be treated. Rapid admixture of a body of water of any size with another body of water is of course a much simpler problem than attempting to uniformly distribute a part or so per million of a gas throughout a body of water. As stated, the absorption of chlorin is, relatively speaking, rather slow; but it is proportionate to the area of contact between gas and liquid. Therefore in making my primary liquid, in lieu of bubbling gas through it, I cause the liquid to spread out so as to present an extended surface and cause the gas to pass in contact with such extended surface of the liquid. In practice I find it usually best to film out the liquid and pass it against a stream of gas as a countercurrent. A bubble being spherical of course offers the minimum surface for the maximum volume. This filming in countercurrent gives me the additional advantage of being able to obtain an accurate proportioning between gas and liquid. In the sterilization of water by chlorin, it is, for reasons stated ante, desirable to obtain the utmost accuracy as to the amounts added.

The filming and proportioning means used may be any of a large number of types.

In a practical embodiment of the present process, presuming a city water supply flowing through a conduit to be the liquid to be treated, I establish a separate flow of liquid which in amount may be more or less than, say, .1 to .02 per cent of the amount of the current. This may be a small flow of water derived from the main current. This separate flow may be sent downward through a tower or the like, filled with coke, stone or any other material adapted to film out the water and enable it to present an extended area of surface. Upward through this tower I pass a current of chlorin. This chlorin may conveniently be derived from one of the cylinders of liquefied gas sold in the trade. Suitable pressure regulating means should be used between cylinder and absorber in order to give accurate control of the amount of gas supplied to the absorber and, thereby, of strength of the liquid solution or the amount of absorbed chlorin passing from the absorber to the body of water to be treated.

I find that by filming out the water and passing it against the gas as a countercurrent, I can produce an efficient absorption at such a rate of speed as to give no substantial chemical disappearance of free chlorin by the time the solution is ready for introduction to the main body of water. Of course in any event the smaller the body of water used for absorption the smaller is the absolute amount of chlorin which can so disappear, but there are certain practical reasons, such as the loss of the chlorin by escape through the vent of the absorption apparatus or from the chlorinated water before it reaches the larger body of water to be treated, which make it desirable to limit the degree of concentration in the minor flow rather than to attempt to reach the maximum absorption.

The stream of liquid coming from the absorber is led into the body of liquid to be treated and admixed therewith as rapidly and uniformly as possible within reasonable limits.

In the accompanying illustrations I have shown, more or less diagrammatically, several apparatus susceptible of use in my process.

In this showing.

Figure 1:
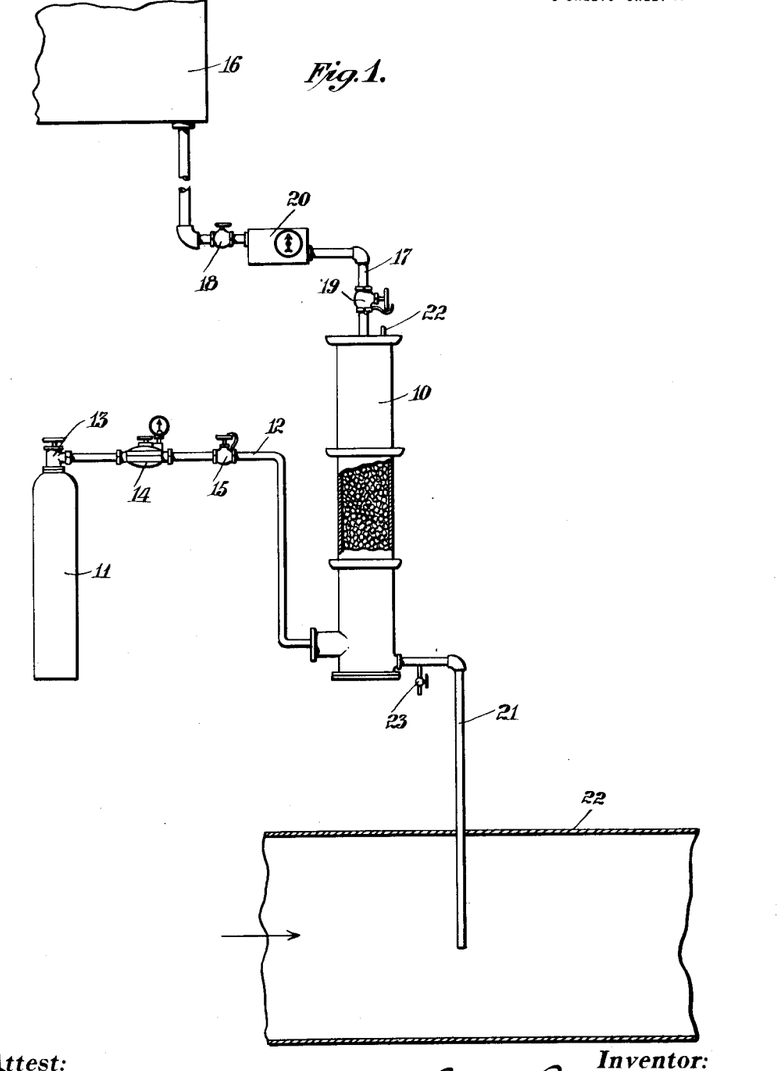
—Figure 1 shows a simple but efficient form of such apparatus more or less diagrammatically in side elevation with parts in section.

Referring first to Fig. 1, the apparatus as shown comprises an absorption tower 10 through which the minor flow of water passes downward to absorb an upwardly moving current of chlorin gas. The chlorin in the apparatus shown is supplied from a tank 11 of compressed and liquefied chlorin gas from which a pipe 12 leads into the lower part of the tower. The tank is provided with a shut-off valve 13 and the supply pipe with a pressure reducing valve 14 and a regulating valve 15. Water is supplied to the tower from any suitable source, as from the tank 16 giving a constant or substantially constant head, through a pipe 17 which leads into the top of the tower and is provided with a shut-off valve 18 and a regulating valve 19. The water supply pipe 17 is also provided with means for measuring the water flowing through it to the tower. For this purpose a suitable meter for indicating the quantity of water which has passed through the meter may be used, but I find it most advantageous to make use of a speed meter to indicate the rate of flow and quantity of water passing at any given time. Such a meter is indicated at 20 and is conveniently located between the shut-off valve 18 and the regulating valve 19 as shown, although this particular location is not of importance. The chlorinated water from the tower is discharged through a pipe 21 to be united with the body of flowing water to be treated. As shown in this figure, the pipe 21 may lead directly into the conduit 22 through which the body of water to be treated flows. The minor flow of water will thus after being chlorinated in the tower be discharged directly into the water to be treated. The absorption tower may be formed of a vertically set shell of earthenware or other suitable material resistant to chlorin filled, or substantially filled, with broken stone, coke or other suitable distributing material adapted to film out the water and cause it to present an extended area of surface for contact with the ascending current of gas. The tower should be provided with a vent, as at 22, whereby the pressure within the tower is maintained at, or substantially at, atmospheric pressure.

The apparatus as above described may be used for carrying out my process as follows: Assuming that the regulating valves 15 and 19 have not yet been set, then these valves being closed, the shut-off valves may first be opened and the reducing valve 14 set to give about the pressure at which it is desired that the gas shall reach the regulating valve 15, and the regulating valves 15 and 19 may then be opened and relatively adjusted according to the strength of solution desired and the quantity of chlorin which is to be added to the flowing water to be treated. Since the gas supplied by the tower is wholly absorbed by the downflowing water and continuously carried away through the pipe 21 to be supplied to the water to be treated, the chlorin is added to the water to be treated at the rate at which the chlorin gas is supplied to the tower. The amount of chlorin to be added may, therefore, be controlled by means of the regulating valve 15, or for any given adjustment of the valve 15 by adjusting the pressure reducing valve 14. And the quantity of chlorin being supplied to the water to be treated at any time, or the rate of supply, may be determined from knowing the strength or concentration of the chlorinated water passing from the tower and the rate of flow of water through the tower. The concentration or strength of the solution may be readily determined by testing samples of the same, and for the purpose of obtaining such samples for testing, a sampling valve 23 may be provided; and the rate of flow or quantity of water passing through the tower is indicated by the speed meter 20, which as shown in this figure is arranged to measure the water flowing to the tower. By testing samples of the chlorinated water passing from the tower, therefore, and by observing the rate of flow of water at the time, the amount of chlorin being added to the water to be treated may be readily determined, and by adjusting the rate at which the gas is supplied to the tower by means of the valve 15 or the valve 14 and testing after adjustment, any desired rate of supply of chlorin to the water to be treated, within the limits of the apparatus, may be readily secured with a degree of accuracy sufficient to meet all practical requirements. Or, if desired, a measured quantity of chlorin may be supplied by adjusting the valves 14 and 15 to give such measured flow as determined by the pressure under which the chlorin is supplied to the orifice at the valve 15 the size of which is fixed by the adjustment of said valve, the meter and sampling means being then used for checking up such measured rate of chlorin supply. The amount of water flowing through the apparatus should, of course, be at least sufficient to completely absorb the whole amount of chlorin gas entering the tower, and in practical operation I find it best to use a considerable excess of water over such minimum amount, as for example, such an amount of water as will give a concentration in the water leaving the absorption tower, of, say, about one gram more or less of chlorin per liter of water. After the valves 14, 15 and 19 have once been set to secure the addition of chlorin to the water to be treated at a desired rate, then, other conditions remaining the same, the supply of chlorin to the water to be treated will continue at such rate, and if the apparatus be shut down at any time, as by closing the shut-off valves 13 and 18, then when the apparatus is to be started up again it is only necessary to open the shut-off valves fully in order to cause chlorin to be supplied again to the water to be treated at the same rate.

Instead of measuring the minor flow of water before it is brought into contact with the gas, I may measure the chlorinated water after it leaves the absorption tower and before it is added to the water to be treated. In either case, I secure the addition of the desired amount of chlorin or chlorin at the desired rate to the water to be treated by adding to such water at a predetermined rate the chlorinated water of the minor flow of a known or predetermined strength. When the water is measured before entering the tower or other absorption apparatus, then in order to secure the uniform addition of the chlorin to the water to be treated the chlorinated water must be allowed to flow as a continuous stream directly into the water to be treated. Such continuous flow of the minor body of water to which the chlorin gas is suplied, gives the best results in practice, and in operating in this way it is usually most advantageous to measure the water before it is brought into contact with the gas. When measurement is made of the chlorinated water, the flow may also be continuous from the tower to the water to be treated, or it may be interrupted and the chlorinated water may be supplied to the water to be treated at a rate which is different from the rate of flow through the absorption apparatus. This method of operation is sometimes of advantage, as in comparatively small plants, since it permits the chlorination of the minor flow to be effected intermittently at a higher rate of flow of the water than the rate at which the chlorinated water is added to the water to be sterilized.

Figure 2:
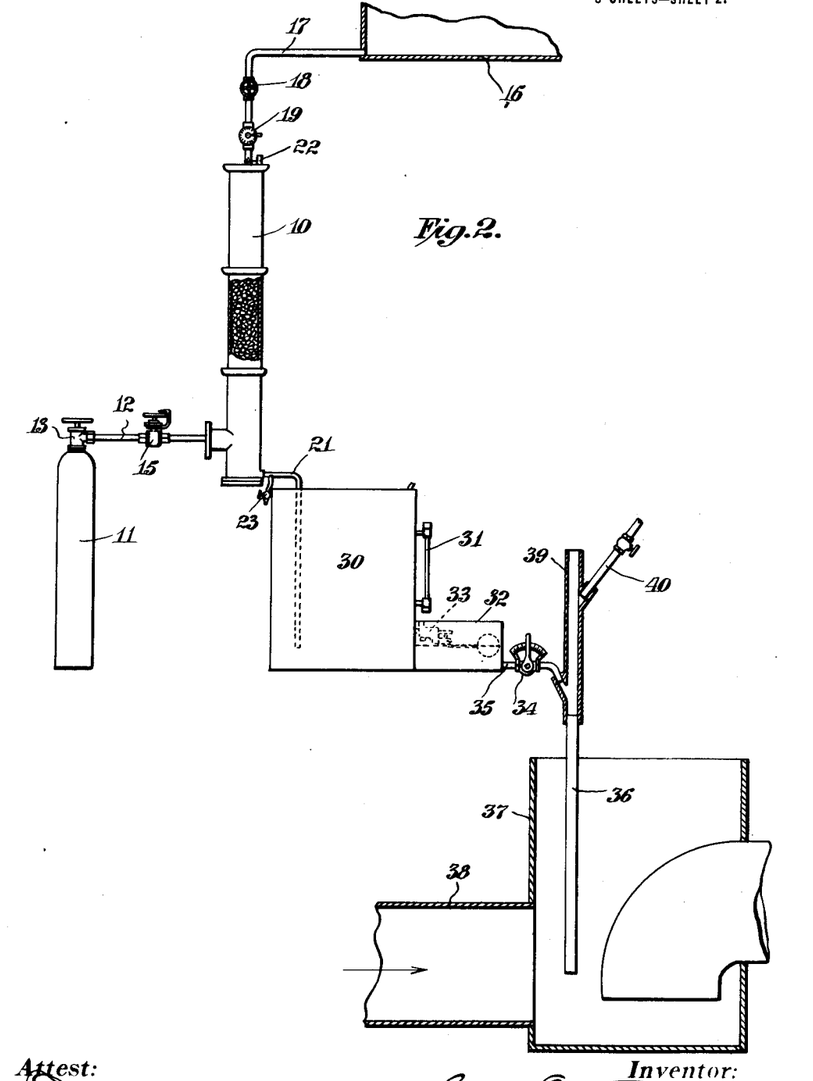
Figs. 2, 3 and 4 are similar views illustrating modified or alternative forms of apparatus.

In Fig. 2 I have shown an apparatus which may be used in this way and which is especially adapted for treating comparatively small bodies of flowing water. The apparatus shown in this figure comprises an absorption tower 10 similar to that of Fig. 1, to the bottom of which the chlorin gas is supplied through pipe 12 from a tank 11, the tank being provided with a shut-off valve 13 and the pipe 12 with a regulating valve 15. A reducing valve may be provided between the tank and regulating valve as shown in Fig. 1, but where the flow of chlorin is comparatively small or not long continued the reducing valve is not necessary for the securing of results sufficiently accurate for all practical purposes. Water may be supplied to the tower as before from a tank 16 or other suitable source through a pipe 17 which leads into the top of the tower and is provided with a shut-off valve 18 and a regulating valve 19; and the tower should be provided with the vent 22. Chlorinated water from the tower is discharged through a pipe 21 as before, but instead of leading directly to the flowing water to be treated, this pipe in the apparatus of Fig. 2 discharges into a measuring tank 30, which to avoid loss of chlorin from the water should be closed but vented and which may be provided with a suitable gage 31 for showing the height of water in the tank. The discharge pipe 21 should best be extended down to near the bottom of the tank as indicated by dotted lines to avoid splashing of the liquid as it enters the tank. From the measuring tank, the chlorinated water flows into a smaller tank 32 through an outlet controlled by a float controlled valve 33 whereby the water is maintained at a constant level in this smaller tank. From this smaller tank the water flows under a constant head past a measuring orifice to the main or comparatively large body of flowing water which is to be treated. The measuring orifice may be provided by any suitable means which may be adjustable for varying the rate of outflow of the water by varying the effective size of the outlet passage or orifice.

In the apparatus shown in Fig. 2 an adjustable measuring valve 34 in an outlet pipe 35 leading from the tank 32 serves this purpose. The chlorin water from the pipe 35 may be united with the body of flowing water to be treated by any suitable means. In Fig. 1 I have shown a discharge pipe 36 which receives the chlorin water from the pipe 35 as extending down into a flow equalizing well 37 which may be considered as part of the conduit through which the water to be treated flows, the discharge end of the pipe 36 being located opposite the inlet end of the main 38 in order to insure a thorough mixing of the water from the pipe 36 with the body of water passing through the equalizing well. In order to avoid variations in the rate of flow of the water from the tank 32 due to variations in the back pressure on the discharge pipe 36, which might result from rise and fall of the water level in the well 37, the pipe 36 should be open to atmosphere, as by means of a stand pipe 39; and I find it desirable to provide an additional flow of water to join the chlorin water where it enters the discharge pipe 36 or stand pipe 39. For this purpose, in the apparatus shown in Fig. 2, a water supply pipe 40 enters the stand pipe 39 at a point above the junction therewith of the pipe 35. This added flow of water serves to take up any chlorin gas which might escape from the water entering the discharge pipe from the pipe 35 and also serves to dilute and increase the volume of the chlorinated water entering the main body of water to be treated, thus insuring a better distribution of the chlorin in the main body of water. This apparatus of Fig. 2 may be used as follows:— Assuming that the regulating valves 15 and 19 have not yet been set, then, these valves being closed, the shut-off valves 13 and 18 may first be opened and then the regulating valves 15 and 19 may be opened and relatively adjusted to adjust the proportionate amounts of chlorin gas and water entering the absorption tower until the water leaving the absorption tower is of, or about of, the concentration desired, as for example, one gram per liter of water. Liquid for test may be taken from the discharge pipe 21 through the sampling valve 23, or liquid for testing may be taken from the measuring tank 30. After the desired concentration has been obtained the regulating valves may if desired be sealed or otherwise set or protected in such a way as to prevent accidental or other unauthorized change in their setting. If the tank 30 becomes filled with the chlorinated water, the shut-off valves 13 and 18 are closed, the regulating valves then remaining adjusted for the desired proportions of gas and water so that when it is again desired to supply the chlorinated water to the tank 30 it is only necessary to open the shut-off valves fully in order to obtain a further supply of the chlorinated water of the same desired concentration. The water from the tank 30 may be drawn off in measured quantity and supplied at a uniform rate of flow to the body of water to be treated by opening the valve 34 to the proper degree, and the rate at which the chlorin is supplied to the body of water to be treated may be varied as desired by suitably adjusting the valve 34. The chlorinated water might be supplied to the tank 30 from the tower at a rate approximating that of the flow from the tank through the measuring valve 34 and discharge pipe 36, or a larger flow may be established through the absorption tower to be cut off entirely when the tank 30 has filled and to be established again to refill the tank at intervals as may be necessary according to the rate at which the chlorinated water is discharged from the tank. In either manner of operating, the chlorinated water from the absorber is led into the body of liquid to be treated without any long continued delay and during the passage from the absorber to the body of water to be treated the chlorinated water is protected from loss of its chlorin gas by being protected against access of circulating air and sunlight. In comparatively small installations the loss of free chlorin from the chlorinated water in the tank 30 even when the tank is refilled only at intervals of several hours will not be such as to count heavily in expense.

The exact amount of the chlorinated water supplied through the discharge pipe 36 during a given interval of time may be determined by measuring the amount withdrawn from the tank 30 during such time, the gage 31 serving to indicate the drop in level in the tank and the scale of the gage either indicating the volume or the distance of the drop from which the volume may be calculated, the size of the tank being known. In this way the rate of outflow for a given setting of the valve 34 may be determined. Instead of depending upon such actual measurement, the valve and head of liquid in the constant-level tank 32 may be standardized so that by simply setting the valve by its scale a desired rate of flow may be obtained and the desired quantity of chlorin thus added to the body of flowing water to be treated. Obviously, it is not necessary that the chlorinated water supplied to the tank 30 should be exactly of any particular concentration, it being sufficient that it be of approximately a desired concentration and that the concentration be known so that the valve 34 may then be set for the necessary rate of flow according to the strength of the solution to add the desired amount of chlorin to the water to be treated. When the regulating valves 15 and 19 have been once set and the strength of the solution supplied to the tank 30 determined, then in further operation of the absorbing apparatus this predetermined concentration will be secured. This assumes that the pressure under which the gas reaches the regulating valve 15 will be constant, and this is the condition when the gas is supplied from a cylinder of compressed and liquefied chlorin gas provided the rate at which the gas is withdrawn from the cylinder is not too high and provided that the temperature changes are not large. For the most exact results, and where it is desired to use a comparatively large amount of chlorin, it would be desirable to provide a reducing and regulating valve as in Fig. 1 between the regulating valve 15 and the shut-off valve 13.

Instead of depending upon the addition to the water to be treated of chlorinated water of a known or predetermined strength and at a predetermined rate for securing the addition of chlorin to the water to be treated in desired quantity or at a desired rate, I may, as before pointed out, secure the desired result of adding a definite quantity of chlorin in solution in water to the water to be treated by measuring the chlorin gas before bringing it into contact with the minor flow of water and then discharging the minor flow of water directly into the main body of water to be treated. In operating in this manner, the minor flow of water need not be a measured flow or in amount bearing any particular proportion to the flow of chlorin gas supplied to be absorbed by such minor flow of water, it being necessary only that the minor flow of water be in sufficient volume to absorb all the chlorin gas brought into contact therewith. As before stated, the apparatus of Fig. 1 may be used in this way, and in Fig. 3 I have shown a form of apparatus especially adapted for carrying out the process in this way.

Figures 3, 4:
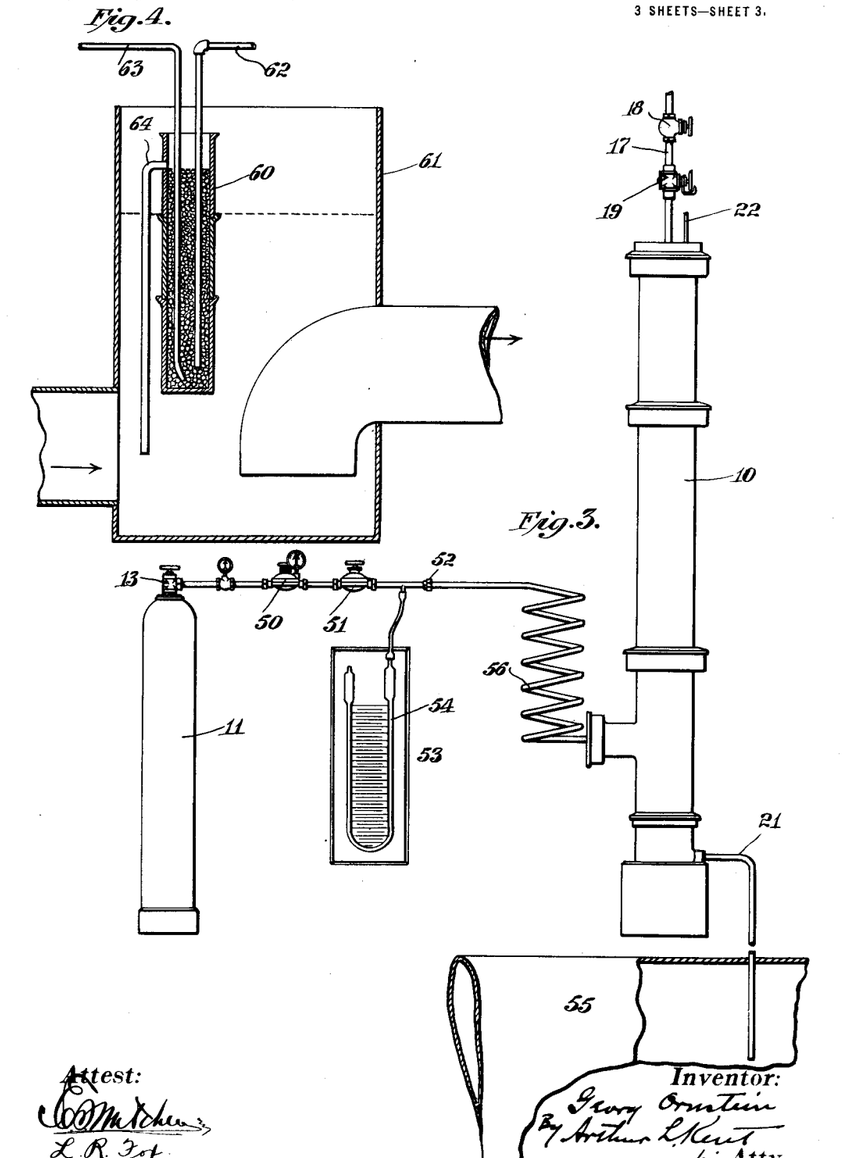

Referring to Fig. 3, the apparatus here shown comprises an absorption tower 10 which may be similar to the tower shown in Figs. 1 and 2 and similarly filled or substantially filled with broken stone, coke, or other suitable distributing material for filming the downflowing water, which enters the tower through a supply pipe 17 leading from a suitable source of supply and provided with a shut-off valve 18, and which may also be provided for convenience with a regulating valve 19. The tower should also be vented as before, as by a vent pipe 22 leading from the top of the tower. The chlorin gas is supplied at a point near the bottom of the tower through pipe 12 leading from a cylinder 11 of compressed and liquefied chlorin gas or from other suitable source of supply. The tank is supplied with the usual shut-off valve 13. The supply pipe 12 is provided with pressure reducing and adjusting means which as shown is formed by two adjustable pressure reducing valves 50 and 51 which serve to maintain in the pipe 12 beyond the valve 51 the desired pressure for which they may be set practically constant even under wide variations in the pressure under which the gas comes to the valve 50. The pipe 12 also has inserted in it at a point between the second reducing valve and the tower a fitting 52 formed to provide a fixed orifice of known size which serves as a measuring orifice. Between the reducing valve 51 and the measuring orifice 52, I connect with the pipe 12 a pressure gage 53 for indicating the pressure under which the gas reaches the measuring orifice. Any suitable form of pressure gage may, of course, be employed, but a high degree of accuracy in indicating the pressure is necessary and I find a two-column gage similar to the usual water gage well suited for the purpose, the liquid in the tube 54 of the gage being sulfuric acid or other suitable liquid which does not react with chlorin gas. The discharge pipe 21 leading from the bottom of the tower may be connected directly into the conduit through which the main body of water to be sterilized flows, or other means may be provided to cause the chlorinated water to pass directly and continuously from the tower into the water to be sterilized. As shown in this figure, the chlorinated water is discharged into a conduit 55, the pipe 21 being arranged to discharge at a point within the conduit suitable for securing the desired intermingling of the liquids.

It is desirable that the moisture from the absorbing apparatus be prevented from traveling backward, through the pipe 12 to the measuring and flow adjusting apparatus. I find that an upwardly extending pipe of sufficient length between the measuring apparatus and the tower is sufficient for this purpose. Such an upwardly extending pipe is shown at 56 in Fig. 3 formed for convenience as a coil of large diameter. So long as the pipe has a substantial upward slant in the direction from the tower to the measuring apparatus, it is the length of the upwardly extending pipe rather than the degree of its upward inclination which is of importance, although the length should be somewhat greater as the inclination is less. Such upwardly extending pipe prevents the moisture from the tower reaching the measuring apparatus for the reason that the vapor cannot diffuse backward through such an upwardly extending path for any considerable distance. Ordinarily I find that a coil of small pipe such as shown having a length of about six feet affords full protection. Such protecting means is always ready to serve its purpose when needed and never interferes with the operation of the apparatus. In using the apparatus shown in this figure, the reducing valve 50 having been set to supply the gas at a pressure more or less above that under which it is desired that the gas shall reach the measuring orifice 52, and the shut-off valve 18 being opened, the second reducing valve 51 will then be adjusted to cause the gas to reach the measuring orifice 52 under the desired pressure according to the quantity of chlorin which it is desired shall pass the measuring orifice and be supplied to the absorption tower. The pressure at the measuring orifice will be accurately shown by the gage 53. Since the orifice 52 is of known size, the rate of flow of gas through the same will depend upon the pressure under which the gas reaches the orifice, so that it is only necessary to supply the gas to the orifice under the proper pressure in order to supply the gas to the tower in a predetermined quantity or at a predetermined rate of flow; and this proper or desired pressure at the measuring orifice is readily secured by adjusting the valve 51 according to the indications of the gage 53. A single reducing valve, preferably supplemented for closer adjustment by a regulating valve as in Fig. 1, may be used instead of the two reducing valves shown in this figure for regulating and maintaining constant when set the pressure at the measuring orifice, and will give good results when the conditions are such that there are no wide variations in the pressure of the gas supply. In order, however, to secure practical constancy in the pressure at the measuring orifice under widely varying supply pressures, as for example when the gas is drawn in considerable quantity from a tank of compressed and liquefied chlorin continuously for a comparatively long time, I find it of advantage to make use of two adjustable reducing valves, as shown and with such an arrangement I am enabled to secure the desired adjustment readily and accurately and to maintain a high degree of constancy in the pressure at and flow through the measuring orifice. The supply of water to the tower through the pipe 17 should be adjusted so that there will be enough water flowing through the tower to completely absorb all the entering chlorin gas, and may be in such quantity as to result in a solution of greater or less strength as desired. Obviously, the exact amount of water flowing through the tower, so long as there is enough, is immaterial, since, whatever the strength of the solution produced, chlorin will be supplied to the main body of water to be treated at the rate at which it enters the tower provided the chlorinated water is allowed to flow freely from the tower into the water to be treated. The rate of supply of the chlorin to the water to be treated depends in this case upon the rate of supply of the chlorin gas to the absorption tower.

In Fig. 4, I have shown a modified form of absorbing apparatus in which instead of filming out the water of the minor flow and bringing the filmed out water and the gas together in countercurrent, I discharge both water and gas into the lower part of a tower or chamber having a filling of broken stone or other suitable distributing material and allow the water to fill the chamber up to an overflow outlet. The water rising slowly through the chamber past the filling of distributing material, presents an extended surface for contact with the chlorin gas so that an efficient absorption of the gas by the water is secured.

As shown in Fig. 4, the tower or absorption chamber 60 is of cylindrical form and is set vertically in a flow equalizing well 61 forming part of the conduit through which the water to be sterilized flows. The water is supplied through pipe 62 and the chlorin gas through pipe 63, both pipes leading down to discharge near the bottom of the chamber. An overflow pipe 64 leads downward from a point near the top of the chamber and above the level of the water in the well 61, and through this pipe the chlorinated water overflowing from the chamber 60 is discharged into the main body of flowing water to be treated. The supply of water and chlorin gas to the absorption chamber may be controlled by means such as shown in the other figures so as to secure the desired addition of chlorin to the water to be treated, but where the absorbing chamber is in an inaccessible position such that sampling for test would be difficult, it is desirable to supply the gas in measured flow as with the apparatus of Fig. 3.

My process is useful for treating all sorts of waters which are benefited by treatment with chlorin, and the term "water" in the claims is to be understood as including all kinds of waters and watery liquids, such as water of city and town supplies, sewage, etc. The proportionate amount of chlorin to be added to the water to be treated will, of course, be determined according to the character of the water.

What is claimed is:

1. In the sterilization of flowing water, the process which comprises establishing a separate minor flow of water, such flow being filmwise in one portion of its path, contacting chlorin gas with such flow in such portion of its path, and thereafter uniting such minor flow of water with the main body of flowing water to be sterilized.

2. In the sterilization of flowing water, the process which comprises establishing a separate minor flow of water, such flow being filmwise in one portion of its path, contacting a predetermined amount of chlorin gas with such flow in such portion of its path, and thereafter uniting such minor flow of water with the main body of flowing water to be sterilized.

3. In the sterilization of flowing water, the process which comprises establishing a separate minor flow of water, causing such minor flow to spread out in one portion of its path to present an extended surface, contacting chlorin gas with such flow in such portion of its path, and thereafter uniting such minor flow of water with the main body of flowing water to be sterilized.

4. In the sterilization of flowing water, the process which comprises establishing a separate minor flow of water, causing such minor flow to spread out in one portion of its path to present an extended surface, contacting chlorin gas with such flow in such portion of its path, and thereafter uniting such minor flow of water with the main body of flowing water to be sterilized, and controlling the quantity of chlorin supplied to the main body of flowing water by controlling the rate of supply of chlorin gas to the minor flow of water.

5. In the sterilization of flowing water, the process which comprises establishing a separate minor flow of water, causing such minor flow to spread out in one portion of its path to present an extended surface, contacting a measured flow of chlorin gas with such flow of water in such portion of its path, and thereafter uniting such minor flow of water with the main body of flowing water to be sterilized.

6. In the sterilization of flowing water, the process which comprises establishing a separate minor flow of water, causing such flow to spread out in one portion of its path to present an extended surface, contacting chlorin gas with such flow in such portion of its path, and thereafter uniting the solution thus produced with the main body of flowing water to be sterilized.

7. In the sterilization of flowing water, the process which comprises establishing a separate minor flow of water, causing such flow to spread out in one portion of its path to present an extended surface, contacting chlorin gas in amount proportionate to the amount of water flowing in the minor flow with such flow in such portion of its path, and thereafter supplying the water so treated at a predetermined rate to the main body of flowing water to be sterilized.

8. In the sterilization of flowing water, the process which comprises establishing a minor flow of water, causing such minor flow to spread out in one portion of its path to present an extended surface, expanding liquefied chlorin to the gaseous state, contacting such chlorin gas with such minor flow in said portion of its path, and thereafter uniting such minor flow of water with the main body of flowing water to be sterilized.

9. In the sterilization of flowing water, the process which comprises establishing a separate minor flow of water, contacting a predetermined amount of chlorin gas with such flow, and thereafter uniting such minor flow of water with the main body of flowing water to be sterilized, whereby chlorin is added to such main body of flowing water at a predetermined rate.

10. In the sterilization of flowing water, the process which comprises establishing a separate minor flow of water, introducing a controlled amount of chlorin gas into such minor flow of water to produce a relatively strong solution of chlorin, and thereafter uniting and mixing such minor flow of water with the main body of flowing water to be sterilized, the rapidity of admixture being such as to insure dissolved chlorin reaching all portions of the main body of flowing water prior to substantial completion of the chemical changes in such dissolved chlorin incident to the dilution by such flowing water.

11. The process of sterilizing large volumes of flowing water which comprises rapidly admixing with such water a relatively strong solution of chlorin, the rapidity of admixture being such as to insure dissolved chlorin reaching all portions of such flowing water prior to substantial completion of the chemical changes in such dissolved chlorin incident to the dilution by such flowing water.

12. In the sterilization of flowing water, the process which comprises establishing a separate minor flow of water, contacting chlorin gas with such flow to produce a solution and thereafter supplying the water so treated to the main body of flowing water to be sterilized.

In testimony whereof I have hereunto set my hand in the presence of two subscribing witnesses.

GEORG ORNSTEIN.

Witnesses:
A. L. KEITT,
PAUL H. FRANKE.